__United States Patent__ [19]

Craig et al.

[11] 4,003,265
[45] Jan. 18, 1977

[54] MASS BALANCING SYSTEM FOR ROTATABLE ASSEMBLIES

[75] Inventors: Robert Jerzy G. Craig, Malibu; Clifton Temple Council, Woodland Hills, both of Calif.

[73] Assignee: Litton Systems, Inc., Beverly Hills, Calif.

[22] Filed: July 9, 1975

[21] Appl. No.: 594,460

[52] U.S. Cl. .................................. 74/5 R; 74/5.4; 74/5.7; 74/573 R
[51] Int. Cl.² ........................................ G01C 19/06
[58] Field of Search ............ 74/573, 5 F, 5 R, 5.4; 51/169; 188/1 B

[56] References Cited

UNITED STATES PATENTS

| 1,218,689 | 3/1917 | Nichols | 74/573 |
|---|---|---|---|
| 1,265,899 | 5/1918 | Forster | 74/573 X |
| 1,352,005 | 9/1920 | Larsson | 74/573 |
| 1,402,312 | 1/1922 | Norton | 51/169 |
| 1,733,821 | 10/1929 | Pontis | 74/573 |
| 1,761,023 | 6/1930 | Pontis | 74/573 |
| 2,543,447 | 2/1951 | Elrod, Jr. | 74/573 |
| 3,453,894 | 7/1969 | Stiles et al. | 74/5 F |
| 3,618,403 | 11/1971 | Bilinski | 74/5 F X |
| 3,678,764 | 7/1972 | Erdley et al. | 74/5 F |

*Primary Examiner*—Samuel Scott
*Assistant Examiner*—F. D. Shoemaker
*Attorney, Agent, or Firm*—Richard Zentner

[57] ABSTRACT

Disclosed herein is an arrangement for counteracting mass unbalance in a rotatable assembly, such as the rotor assembly of a gyroscope. The invention proposes the use of two coaxially and mutually independently rotatably displaceable, mass eccentricity-producing balance weights, of which each can be assembled with a support element forming part of the rotatable assembly in any one of a great number of angular orientations.

5 Claims, 3 Drawing Figures

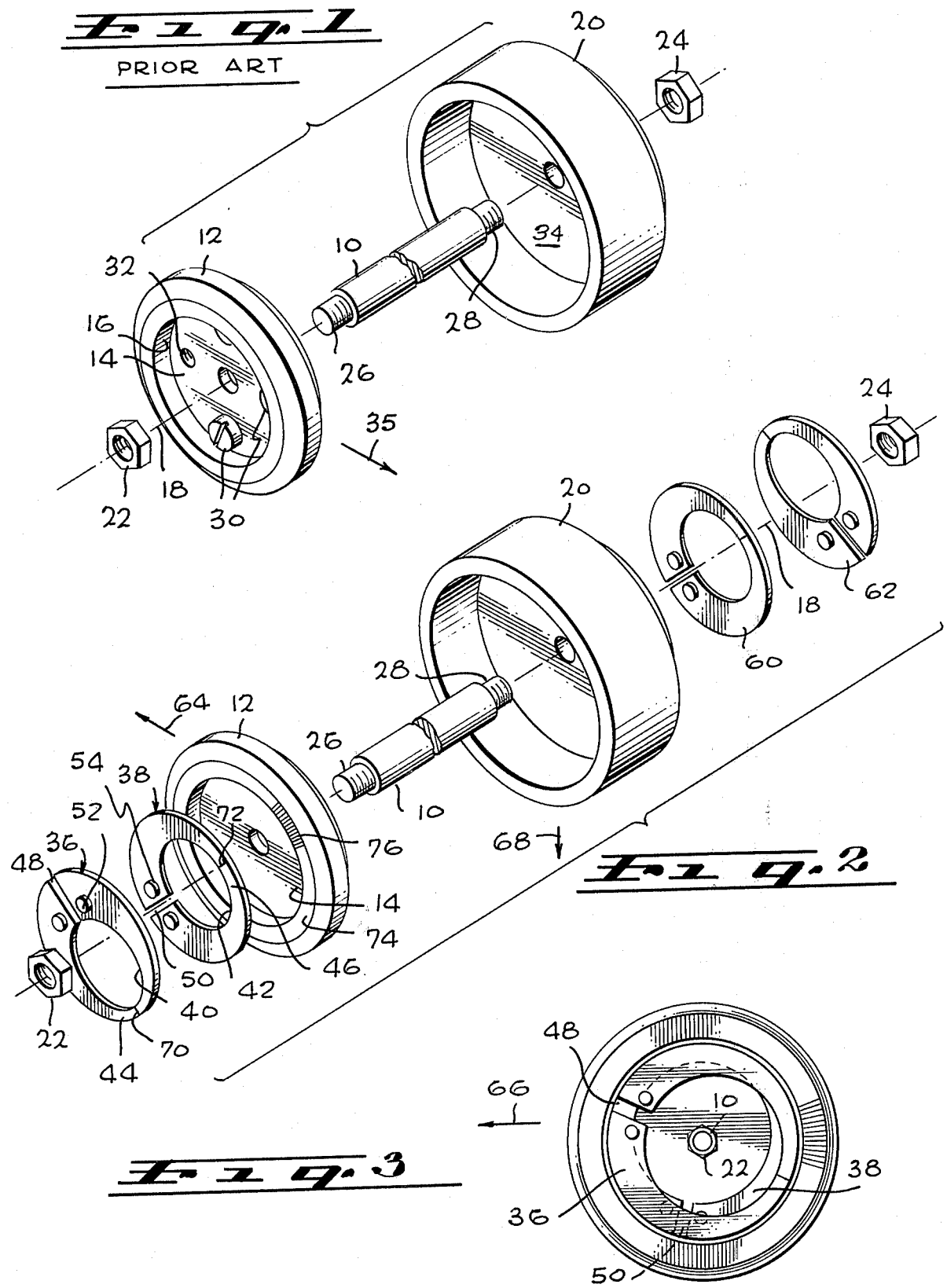

MASS BALANCING SYSTEM FOR ROTATABLE ASSEMBLIES

FIELD OF THE INVENTION

This invention relates to rotatable assemblies, in general, and, particularly, to means for counteracting mass unbalance of such assemblies. The invention has for one of its major objects the creation of an improved arrangement for controlling the location of the center of mass of a rotating assembly, such that the center of mass can be brought to lie, to a high degree of accuracy, in the axis of rotation.

BACKGROUND OF THE INVENTION

In a great number of technological fields, rotatable assemblies are used wherein components of such assemblies rotate, during operation, at very high speeds, mostly supported by a driving shaft which is driven into rotation. Similarly, in most instances, the shaft itself is supported by bearings. Theoretically speaking, the center of mass of such assemblies should, as accurately as possible, coincide with, or lie in, the axis of rotation. In practice, this is hardly ever the case with the accuracy which would be desirable, because of manufacturing tolerances and lack of homogeneity of the material of the components, as the two main causes for inaccuracy. It is well known that the condition thus described and referred to as mass unbalance is most undesirable.

One of the various consequences of mass unbalance is the detrimental effect upon the bearings which are known to wear out rapidly under these conditions. Also, it is undesirable to transmit unbalance forces or moments to the structure supporting the rotating assembly. Moreover, in many fields of application, mass unbalance is undesirable for other reasons, such as the inaccuracies which may thereby be introduced into the operation of a measuring or indicating instrument. As one example to be mentioned, such field of application is in connection with gyroscopes wherein it is well known that means should be provided which permit eliminating mass unbalance as much as possible.

DESCRIPTION OF THE PRIOR ART

In the past, and now specifically in connection with the design of gyroscopes, the means for eliminating mass unbalance have been small screws which fitted into tapped holes of at least one of the components of the rotor assembly of a gyroscope. By angularly displacing such screws within the tapped holes, their position could be adjusted. By the provision of a plurality of tapped holes, the locations for, and the number of, such screws could be selected and, particularly, fine adjustment of mass unbalance correction was achieved by filing or grinding away a portion of such screw. Thus, it can be seen that the process of correcting or eliminating mass unbalance conditions in accordance with known methods was a most tedious, time-consuming procedure.

SUMMARY OF THE INVENTION

Generally speaking, the invention provides a novel system for counteracting, i.e. substantially eliminating, mass unbalance conditions in a rotatable assembly and may be viewed as the combination of a structural support element mounted for rotation about an axis with at least two coaxially and mutually independently rotatably displaceable, mass eccentricity-producing balance weights for assembly with the support element. Thus, as will be seen from the detailed description further below, the invention contemplates the use of at least two balance weights for assembly with the structural support element, with each balance weight having an asymmetrical mass distribution, i.e. its center of mass is located at a radial distance from the axis when assembled with the support element. Securing means are provided for maintaining each of the balance weights assembled with the support element in any one of a great number of angular orientations about the axis.

From the explanations given thus far, it will have become clear that the mass unbalance control system of the present invention can be useful with most any rotating assembly. Technological fields of application are the automotive industry, engines and machine tools, just to mention a few of the great number of possible examples.

One specific field of application is the technology of gyroscopes and, since the invention has been developed in connection with the design of gyroscopic instruments, the embodiment described further below illustrates an implementation in connection with gyroscopes.

BRIEF DESCRIPTION OF THE DRAWINGS

The invention will become better understood from the following detailed description of one embodiment thereof, when taken in conjunction with the drawings, wherein:

FIG. 1 is a schematic, exploded view of a rotatable assembly, which may be a partial illustration of the rotor assembly of a gyroscope, with mass unbalance control arrangements in accordance with the prior art;

FIG. 2 illustrates the same partial, rotatable assembly as shown in FIG. 1, also in an exploded view, but provided with the mass unbalance control system in accordance with one embodiment of the invention; and FIG. 3 is a front view of the assembly of FIG. 2.

DETAILED DESCRIPTION

With reference to FIG. 1, a rotatable assembly is shown schematically in an exploded view, with the illustrated major components being a shaft 10, a flat circular plate 12 having a recess 14 defined by a cylindrical coaxial rim 16 facing the axis 18 of rotation, a hollow, cylindrical, pot-shaped component 20 and two nuts 22 and 24 which fit threaded end portions 26 and 28 of the shaft 10, having diameters shorter than that of the shaft, so that, upon assembly, the structural elements 12 and 20 can be secured to the shaft 10 for rotation therewith.

The rotatable assembly thus described and illustrated is intended to schematically represent any one of the great number of possible implementations of mass balance correction arrangement in accordance with the prior art. It is understood that the mass balance condition is that when the center of mass coincides with, i.e. lies in, the axis of rotation of the system. In accordance with known methods, short screws 30 have been provided which fitted into tapped holes 32, one such hole and three screws being illustrated in connection with the first structural element, which is the plate-shaped element 12. The far-away side of the pot-shaped second structural element 20 will, as a rule, also have a recess (not shown) corresponding to recess 14 in plate 12, and tapped holes (not shown) will be provided which may receive screws (not shown) corresponding to screws 30.

In accordance with mass balancing methods used heretofore, a screw 30 may, but need not, be assembled with any tapped hole 32, so that, wherever such screw 30 is used, such as at the three locations shown in FIG. 1, each screw adds an eccentric small mass to the system. Moreover, each screw may be filed or ground to reduce its mass until it has been determined that the center of mass of the entire system lies in the axis 18. As a matter of course, the number of four tapped holes 32 for possibly accommodating screws is arbitrary, and it should also be mentioned that it is desirable to have at least two coplanar sets of balance weights, such as screws 30 axially offset one with respect to the other, as described, in order to achieve optimum results. It will be clear that the process of determining the number of screws 30 to be used, of determining into which one of the holes 32 screws should be inserted and, particularly, the extent to which screws should be filed or ground to reduce their masses is a most tedious process. In FIG. 1, arrow 35 indicates the direction of force resulting from the presence of screws 30, whenever the illustrated system is driven into rotation, it then being the purpose to select the number of screws, their position and their size such that the force represented by arrow 35 counteracts any unbalance existing without the screws 30.

Thus far, the structural elements 12 and 20 have only been identified by their shapes, it being understood that they can schematically represent most any component part of a rotatable assembly. In the specific application of the present invention, and where it replaces the prior art system illustrated in FIG. 1, the flat, plate-shaped element 12 may be the stop plate of the rotor of a gyroscope, and the pot-shaped structural element 20 may be the hysteresis ring support of the gyroscope. It is, of course, understood that, between the stop plate 12 on one end in the axial direction and between the internal circular surface 34 of the hysteresis ring support 20 toward the other end of the assembly, a number of component parts will be mounted, be it that such component parts rotate with the shaft 10 or are stationary when forming part of a housing. It is well known that, in connection with the rotor assemblies of gyroscopes, these additional elements, which have been omitted from the drawings, may be a sensitive element assembly, a torquer coil assembly, a pickoff assembly and a housing assembly, including cover elements of the housing provided at either one of the two ends of the assembly. Since these elements are well known in the specific art of gyroscope design and also considering that the invention is not restricted to such designs, these elements need not be described for conveying an understanding of the invention, so that no further detailed description nor illustration is believed necessary. It is believed to be sufficient to draw attention to U.S. Pat. No. 3,678,764, assigned to the assignee of the present invention, which discloses a gyroscope and wherein, for example in FIG. 1, a possible structure of a gyroscope is illustrated to include a stator and a rotor, each composed of a great number of elements. As shown in FIG. 1 of that patent, the hysteresis ring of the synchronous motor for driving the rotor into spinning motion is supported by a cylindrical element which, in the illustration of the present invention, may correspond to the hysteresis ring support 20. The rotor of this known structure also includes a plate provided with stop elements and thus is known in the art as a "stop plate." Alternatively, corresponding elements forming the stop assembly for a gyroscope are also described in U.S. Pat. No. 3,618,403, inasmuch as it illustrates one implementation of a stop plate which limits the degree of disorientation between different parts of the rotor of the gyroscope, it being understood that a stop plate can be mounted at any convenient location of the rotor to perform the known function in a known manner as substantiated by the two aforementioned patents.

Referring now to FIGS. 2 and 3 of the drawings, these figures illustrate a similar assembly, also composed of a shaft 10 with terminal threads 26 and 28 for receiving nuts 22 and 24, thereby to secure to the shaft, for rotation therewith about axis 18, a stop plate 12 and a hysteresis ring support 20. All these elements may be identical to those shown in FIG. 1.

As to the mass unbalance control system in accordance with the present invention, there are shown two such systems, of which one cooperates with the stop plate 12 and the other one with the hysteresis ring support 20.

Referring to the mass unbalance control system which is associated with the stop plate 12 and thus shown in the foreground of FIG. 2, it may be described as being composed of two, in essence identical, balance weights 36 and 38. Each one of these two balance weights can be a relatively thin, circular plate having an eccentric, suitably circular opening 40 and 42, respectively. By the fact that the openings 40 and 42 are eccentric, the essential ring-shaped balance weights may descriptively be designated as snap rings, because, by virtue of the resiliency of the material in the area of the narrow portion 44, 46 of each one of the two rings, this area will act as a resilient hinge. This is so, because radially extending slots 48, 50 are provided in the widest area of the rings. As a result, the widest areas can be temporarily brought into contact one with the other to close the slots 48, 50, whereas, upon removal of the compressive force causing such deformation, each ring will assume its normal, open configuration. To facilitate applying the deforming forces, means, such as holes or the illustrated protrusions 52 and 54, may be provided in the areas of the wider portions of the rings, i.e. the balance weights, 36, 38 at either side of the slots 48, 50. Such deformations have been found practical for temporarily closing the slots 48, 50. The forces, which may be applied by means of pliers, result in a slight reduction of the external dimensions of each one of the two balance weights 36 and 38. The provision of a resiliently deformable balance weight as illustrated justifies the descriptive designation as internal snap rings.

In similarity with the illustration in FIG. 1, the stop plate 12 of the assembly shown in FIG. 2 also has a flat circular recess 14 which, in accordance with the prior art system of FIG. 1, accommodated the balance screws 30. As shown in FIGS. 2 and 3, no screws nor tapped holes are needed in accordance with the invention. Rather, as best seen in FIG. 3, the two balance weights 36, 38 can be accommodated in the recess, with each balance weight being susceptible of any desired angular orientation. Their insertion into the recess is facilitated by their resilient construction, inasmuch as, under use of an appropriate tool and the deformations 52 and 54, each one of the rings, one after the other, can be temporarily reduced in its overall dimension, and inserted into the circular recess 14.

If then released, the resiliency of the snap rings 36, 38, constituting the balance weights, will cause them to expand again, and they will tightly fit into the recess 14, by virtue of their periphery engaging the cylindrical rim 16 of the recess.

It will, of course, be realized that the two identically shaped balance weights 60 and 62, shown in the background of FIG. 2, may be inserted in an identical manner into a recess (not shown) in the far-away surface of hysteresis ring support 20.

As will be realized from the specific shape of the snap rings 36, 38, 60 and 62, each has an asymmetrical mass distribution, inasmuch as its center of mass is located at a radial distance from the rotational axis 18. The specific shape of the balance weights providing a resilient configuration thus constitutes a suitable securing means which maintains each of the balance weights assembled with a support element which, in the case of the described embodiment, is the stop plate 12 or the hysteresis ring support 20. During rotation of the system, centrifugal forces will assist in retaining the balance weights in their position.

It will also be realized that each one of the two balance weights of one pair, i.e. balance weights 36, 38 or balance weights 60, 62, causes a mass unbalance, but, since each one of the rings can be inserted such that it assumes any one of a great number, actually an infinite number, of angular orientations about the axis 18, each pair can be used to introduce a mass balance which is equal in magnitude and opposite in direction to the mass balance of the system in the absence of the rings. This is precisely the conditon which causes cancellation of the existing mass balance or, in other words, assists in bringing the center of mass of the assembly to lie within the axis 18.

For purposes of illustrating this condition, arrows 64 and 66 indicate the force which, during rotation, will result from the insertion of balance weights, i.e. snap rings, 36, 38 in that angular orientation in which they are illustrated in the exploded view of FIG. 2 and the front view of FIG. 3, respectively. It will be realized that the magnitude of the resultant force will decrease with the size of the angles which the radii of the centers of mass, which lie in the slots 48, 50, form with the direction of the resultant force. The direction of the resultant force can be adjusted by rotational displacement of both rings, without changing the magnitude of the angle formed between their two orientations. The arrow 68 indicates the resultant force which will be generated by assembly of snap rings 60, 62 with the recess (not shown) in the backside of hysteresis ring support 20.

Under certain conditions, it may be desirable to use equipment known as dynamic balancer which automatically determines the mass unbalance of a rotating system. It is considered that such dynamic balancer can be used to determine indications which then can be employed to automatically position to the balance weights, i.e. snap rings, 36, 38, 60 and 62 within the recess 14 of the stop plate 12 and in the recess (not shown) in the hysteresis ring support 20. For that purpose, as only illustrated for the balance weights 36 and 38, each may be provided with marks 70, 72 at any appropriate location, such as the narrowest area 44 and 46, respectively, and the adjacent surface 74, which surrounds the recess 14, may then be provided with a dial, or scale, 76. If the graduations of the scale are, for example, numbered or otherwise identified, it is possible that the dynamic balancer which determines mass unbalance can be programmed to indicate the proper graduation which must be used when inserting the balance weights, namely the snap rings, 36, 38, 60, 62 in such a position that a maximum mass balance effect is achieved.

In the foregoing description of the illustrated embodiment, the balance weights take the configuration of the so-called snap rings, but it will be obvious that the basic concept of the present invention can be implemented by different shapes and configurations of the balance weights and by different means for securing the balance weights to, and for maintaining them assembled with, their support element which, in the case of a gyroscope rotor assembly, could be the stop plate 12 and the hysteresis ring support 20. By way of example, the securing means which maintain the balance weights in a desirable position and orientation may be springs, or clamps, or any suitable type, or it could be any known fastening system which may form part of the stop plate or of the hysteresis ring support. As an example of interest, the balance weights which need, of course, not be circular plates, but could have any other configuration as long as their center of mass will be eccentric with respect to the axis 18, could be permanent magnets which will be retained by magnetic forces in a support element of steel.

Thus, generally speaking, the invention may be implemented by a great number of differently shaped and position-maintained balance weights as long as these balance weights are coaxially and mutually independently rotatable about the axis of the system and each is susceptible of producing the mass eccentricity which, in combination with the mass eccentricity produced by the other balance weight, is needed to compensate for the mass unbalance of the system as it would exist in the absence of balance weights. Thus, the general principle of the invention can be seen to be applicable for rotationally mounted systems used in a great number of technological fields.

What is claimed is:

1. A gyroscope, comprising
   a rotor mounted for rotation about axis;
   a pot-shaped hysteresis ring support forming part of said rotor;
   a stop plate of the rotor accommodated in said hysteresis ring support, said stop plate having a recess defined by radially inwardly oriented surface locations surrounding and facing said axis;
   at least two substantially identically shaped balance weights for assembly with said stop plate accommodated within said recess by virtue of frictional engagement of peripheral areas of the balance weights with said radially inwardly oriented surface locations;
   each balance weight having an asymmetrical mass distribution with respect to said axis when assembled with said stop plate; and
   spring means associated with each balance weight for resiliently urging at least some peripheral areas of each said balance weight outwardly, to thereby removably retain each of the balance weights assembled with said stop plate in any one of a great number of angular orientations rotationally displaced one from the other about said axis.

2. The combination of claim 1, wherein the balance weights are identically shaped flat plates of substantially circular peripheries having eccentrically located circular openings therethrough, with the resultant asymmetrical ring of varying width having a radial slot, the resiliently spread-apart portions of the slotted ring constituting the means for urging the periphery of each balance weight into engagement with the rim of said recess.

3. The combination of claim 2, wherein the radial slot traverses the widest area of the asymmetrical ring.

4. The combination of claim 2, comprising deformed areas of the balance weight portions adjacent to and at either side of the radial slot for permitting temporarily closing the slot by applying forces to said portions, thereby to temporarily reduce the peripheral dimension of the balance weight while adjusting its angular orientation.

5. The combination of claim 1, wherein said stop plate is provided with graduations and each balance weight has a pointer mark, to thereby permit identifying angular orientations of each balance weight in the form of a reading upon the graduations.

* * * * *